United States Patent [19] [11] 4,320,042
Anderson et al. [45] Mar. 16, 1982

[54] BINDER COMPOSITIONS AND PROCESS FOR PREPARING SAID COMPOSITIONS

[75] Inventors: Hugh C. Anderson, Barrington; James E. Doyle, Carpentersville; Russell B. Lembke, Crystal Lake, all of Ill.

[73] Assignee: The Quaker Oats Company, Chicago, Ill.

[21] Appl. No.: 217,449

[22] Filed: Dec. 17, 1980

[51] Int. Cl.$^3$ .................. C08G 8/04; C08L 61/06
[52] U.S. Cl. .............................. 523/144; 164/526; 260/998.18; 528/126; 528/127; 524/594
[58] Field of Search ................... 260/38, 998.18; 164/526; 528/126, 127

[56] References Cited

U.S. PATENT DOCUMENTS 3,390,127 6/1968 Schick et al. .................. 528/127
3,403,721 10/1968 Robins et al. .................. 164/526
3,409,579 11/1968 Robins ........................... 260/38
4,166,166 8/1979 Nakamura et al. ............. 528/127

Primary Examiner—J. Ziegler
Attorney, Agent, or Firm—Neuman, Williams, Anderson & Olson

[57] ABSTRACT

Binders for foundry core sand and other binder applications are produced from acetophenone.

6 Claims, No Drawings

BINDER COMPOSITIONS AND PROCESS FOR PREPARING SAID COMPOSITIONS

This invention relates to the binder compositions and in particular to binder compositions for core sand and the like used in metal foundries.

The cumene hydroperoxide process for production of phenol and acetone is well known. Basically, this process involves oxidation of cumene to a concentrated hydroperoxide, cleavage of the hydroperoxide, neutralization of the cleaved products and distillation to recover acetone and phenol. The bottoms resulting after distillation of acetone and phenol from the reaction mixture contains various by-products, the principal one being acetophenone and smaller amounts of phenol, cumyl phenol, isopropyl phenol and trace amounts of cresols and cumene.

In accordance with the present invention we have found that acetophenone or the bottoms containing acetophenone resulting from the distillation of acetone and phenol from the reaction mixture of the cumene process can be advantageously used to form binders for core sands and the like used in metal foundry operations.

The expression "core sand" is used herein to include sand used in making shapes of all sorts for foundry purposes, including sand shapes which are to be used as mold cores, sand shapes useful in other casting processes, including sand shapes which are made in patterns and cured therein as well as free standing sand shapes which may be cured in conventional ovens or in microwave ovens for any desirable purpose in foundry work.

The core sand binders according to this invention are produced by reacting paraformaldehyde, phenol and acetophenone or acetophenone bottoms using furfuryl alcohol as solvent. The expression "AP bottoms" as used herein means the bottoms resulting after distillation of acetone and phenol from the cumene process for production of phenol and acetone. To prepare the binders, paraformaldehyde, phenol and acetophenone or "AP bottoms" are reacted together under basic conditions using furfuryl alcohol as solvent. The mixture is catalyzed with from about 0.5 to 10% by weight of the mixture of a base such as sodium hydroxide, barium hydroxide, calcium hydroxide, sodium carbonate, potassium hydroxide, potassium acetate, sodium acetate, triethylamine, triethanolamine and the like. The mixture at a pH of 7.5 to 12, preferably 8 to 11, is reacted at a temperature on the order of about 90° C. to 110° C. (approximately reflux temperatures) for about four hours.

The temperature of the reaction is maintained at approximately reflux temperature and to this end liquids such as water or methanol can be added to the mixture. When using methanol to control the reflux temperature, longer reaction times are usually required. Preferably, water in amounts of up to about 4% by weight of the mixture is used to control the reflux temperature. The usable viscosity range is from about 1.7 to 4.0 seconds as measured on the bubble viscometer in accordance with the standard method set forth in the American Society for Testing and Materials, ASTM designation D1545-63. The preferred viscosity range is from about 200 to 400 centipoises, Brookfield viscosity at 25° C. The composition is then neutralized, if necessary, to a pH from about 6 to 7.5 with an effective amount of a suitable acid, such as, for example, formic or toluene sulfonic acid, chloroacetic acid, or any other suitable medium-weak acid. The resulting composition is eminently suitable as a binder for core sands with the binder exhibiting desired short work times and good tensile strengths.

The amount of the reactants used to prepare the binders can be varied and preferably will be used in amounts as follows: paraformaldehyde, 6–22%, phenol, 6–30%, acetophenone or "AP bottoms", 2–20%; and furfuryl alcohol, 40–80%; all percentages being on a weight basis. Due to economic considerations "AP bottoms", being much cheaper than pure acetophenone, are preferred for use according to this invention.

"AP bottoms" starting materials are available commercially as a by-product of the cumene process for production of phenol and acetone. One such supplier of "AP bottoms" is Monsanto Chemical Co. Typical composition values on these materials are as follows:

| "AP bottoms" | |
|---|---|
| Acetophenone | 40–60% |
| Isopropyl alcohol | 8–20% |
| Phenol | 2–10% |
| Cumylphenol | 2–10% |
| Cresols | 1% |
| Cumene | 1% |

The core sand binders of this invention are applied to sand in conventional manner and are catalyzed to form a rigid material by acids such as toluene-sulfonic acid, phosphoric acid, benzene-sulfonic acid, xylene-sulfonic acid, as well as other standard acid catalysts known and used in the art. The acid catalysts are used in amounts ranging from about 15 to 30% by weight of the binder. Curing of the binders is accomplished by conventional curing methods.

It is generally preferred to use with the binders of this invention a silane glass or silica adhesion promoter in an amount ranging from about 0.1% to 3% based on the weight of the binder. Such silane adhesion promoters are well known in the art and include for example, gamma-mercaptopropyltrimethoxysilane, N-beta-(aminoethyl)-gamma-aminopropyltrimethoxysilane, beta-(3,4-epoxycyclohexyl)ethyltrimethoxysilane, gamma-glycidoxypropyltrimethoxysilane, gamma-aminopropyltriphenoxysilane, gamma-aminopropyltribenzoyoxysilane, gamma-aminopropyltrifurfuroxysilane, gamma-aminopropyltri (o-chlorophenoxy)silane, gamma-aminopropyltri (p-chlorophenoxy)silane, gamma-aminopropyltri(tetrahydrofurfuroxy)silane, methyl[2-gamma-triethoxysilypropylamino)ethyl amino]3-propionate in methanol, modified amino-organosilane, Ureido-silane, mercaptoethyltriethoxysilane, chloropropyltrimethoxysilane, vinyltrichlorosilane, vinyltriethoxysilane, vinyltrimethoxysilane, gamma-methacryloxypropyltrimethoxysilane, gamma-methacryloxypropyltri(2-methoxyethoxy)silane, gamma-glycidoxypropyltrimethoxysilane, vinyltriacetoxysilane, gamma-mercaptopropyltrimethoxysilane, gamma-aminopropyltriethoxysilane, N-beta(aminoethyl)-gamma-aminopropyltrimethoxysilane.

The advantages of the present invention will be further apparent from the following examples.

EXAMPLE 1

This example demonstrates use of pure acetophenone in preparing a binder. 23.4 grams of acetophenone, 140 grams of furfuryl alcohol, 36.6 grams of phenol, 7.66 grams of water, 46.2 grams of paraform (containing 91% formaldehyde) and 2.93 grams of a 50% solution of sodium hydroxide in water were placed in a 500 milliliter, 3-neck, round-bottom flask equipped with condenser and mechanical stirrer. Contents of flask being stirred was heated with glas-col heating mantle to 100°±2° C. in thirty minutes and maintained at this temperature for four hours. Binder was quickly cooled to room temperature with ice bath and neutralized with 85% phosphoric acid to a pH of 6.9. Viscosity of the binder was 277.5 centipoises at 25° C. Binder contained less than 0.5% unreacted formaldehyde and less than 1.0% unreacted phenol.

EXAMPLE 2

This example demonstrates the use of "AP bottoms" (with typical analysis of 40-60% acetophenone, 8-20% isopropyl phenol, 2-10% phenol, 2-10% cumyl phenol, less than 1% cresols and less than 1% cumene) in preparing a binder. The procedures used in this example were identical to those in Example 1 in every respect except that an equal weight (23.4 grams) of "AP bottoms" was substituted for pure acetophenone. Viscosity of the binder was 114.0 centipoises at 25° C. The binder contained less than 1.5% unreacted formaldehyde and less than 1.0% unreacted phenol. Formaldehyde and phenol contents and viscosities of the binders in Examples 1 and 2 are within a perfectly acceptable range for use in various applications.

EXAMPLE 3

This example demonstrates the use of binders prepared according to Examples 1 and 2 in a foundry no-bake application. Foundry sand mix was prepared by first admixing and mulling 3,000 parts by weight of foundry sand and 20% (based on binder) of a 65% solution of toluene sulfonic acid in water until distribution of acid on sand was uniform. Then this resulting sand/acid mix and 1.0% (based on sand) of the binder of Example 1 or Example 2 (containing 0.3 A1160 silane/based on binder) were admixed and mulled further until all liquid components were uniformly distributed on the grains of sand. Immediately after this final mulling, mix was packed into an appropriate 12-cavity mold to form dumbbell-type bars of one inch cross section. After bars had cured enough to be handled carefully without breaking, they were removed from mold. Six bars were placed in high humidity cabinet and six bars left in room and all twelve bars allowed to cure overnight at room temperature. Tensile strengths (p.s.i.) of the bars were determined the following morning and the results are summarized for binders of Examples 1 and 2 in the following table where corresponding results are also included for furfuryl alcohol and FAR 5, which are commercial binders.

| BINDER | TENSILE STRENGTH[1] Ambient RH-60% | Cabinet RH-92% |
|---|---|---|
| Example 1 | 365 | 255 |
| Example 2 | 335 | 240 |
| Furfuryl Alcohol | 265 | 215 |
| FAR 5 (95% Furfuryl alcohol + 5% Resorcinol) | 295 | 295 |

[1]Each value is average for six bars.

As can be seen from the above, binders of this invention are useful in foundry no-bake applications. For a given binder, tensile strength as well as cure rate can be greatly influenced by type of sand, amount and type of acid, temperature, relative humidity, etc. These parameters can be routinely determined by those skilled in the art to provide a desired result.

EXAMPLES 4-20

In these examples, paraformaldehyde, phenol and "AP bottoms" were reacted in furfuryl alcohol for four hours at a temperature of 100° C. The reactions were catalyzed with 1% by weight of a 50% aqueous solution of sodium hydroxide. The amounts of the reactants on a weight basis are shown in the table.

The "AP bottoms" starting material used in these specific examples had the composition (% by weight):

| Acetophenone | 49.6% |
|---|---|
| Isopropyl phenol | 9.7% |
| Phenol | 7.1% |

The tensile strengths of the binders were evaluated after storage overnight at ambient relative humidity of 48% and in a separate test after storage overnight at a high humidity of 91%. In each test 0.30 parts A-1160 Ureido silane (T.M. Union Carbide Co.) were added to each respective binder. Then 3000 parts Wedron 5025 silica sand were admixed with 30 parts of each respective binder and 20% of a 65% solution of toluene sulfonic acid catalyst in water (based on the weight of the binder). The sand-binder-catalyst mixes were charged into a multiple mold shaping element and allowed to cure.

The strip times were determined by placing a portion of the sand mixture in a box mold and observing the time when this material loses its plasticity (develops measurable scratch hardness).

| | CHARGE | | | | | | PRODUCT | | | | | TENSILE | | |
|---|---|---|---|---|---|---|---|---|---|---|---|---|---|---|
| Example | % FA | % Paraformaldehyde | % Phenol | % Acetophenone | % Water | Total Phenolic/ CH$_2$O (wt/wt) | Brookfield Viscosity 25° C. (cps) | % CH$_2$O | % Phenol | % Acetophenone | % Water | Ambient (psi) | High Humidity (psi) | Strip Time (mins) |
| 4 | 62.3 | 13.9 | 13.9 | 6.9 | 3.0 | 1.49/1 | 130.0 | 0.55 | 2.25 | 1.67 | 8.82 | 330 | 240 | 70 |
| 5 | 66.2 | 8.8 | 8.8 | 13.2 | 3.0 | 2.5/1 | 57.2 | 0.41 | 3.05 | 3.83 | 6.03 | 270 | 195 | 150 |
| 6 | 51.4 | 17.1 | 11.4 | 17.1 | 3.0 | 1.67/1 | 154.0 | 1.56 | 1.47 | 3.41 | 9.45 | 290 | 155 | 133 |
| 7 | 69.3 | 13.9 | 9.2 | 4.6 | 3.0 | 1.1/1 | 78.0 | 2.43 | 1.07 | 0.99 | 7.00 | 345 | 205 | 108 |
| 8 | 48.5 | 10.6 | 2.65 | 16.2 | 3.0 | 3.55/1 | 88.0 | 0.24 | 8.08 | 6.48 | 8.00 | 180 | 115 | 180 |
| 9 | 66.2 | 8.8 | 17.7 | 4.4 | 3.0 | 2.51/1 | 66.0 | 0.18 | 6.22 | 1.62 | 6.97 | 305 | 180 | 90 |
| 10 | 51.4 | 17.1 | 22.8 | 5.7 | 3.0 | 1.67/1 | 130.0 | 0.91 | 3.80 | 1.91 | 9.42 | 315 | 195 | 120 |
| 11 | 58.2 | 11.6 | 15.5 | 11.6 | 3.0 | 2.33/1 | 84.0 | 0.28 | 3.95 | 3.84 | 8.27 | 300 | 160 | 105 |
| 12 | 72.8 | 9.7 | 9.7 | 4.9 | 3.0 | 1.49/1 | 58.8 | 0.94 | 2.18 | 1.25 | 6.34 | 267 | 209 | 147 |
| 13 | 58.2 | 19.4 | 12.9 | 6.5 | 3.0 | 1/1 | 144.0 | 3.47 | 1.04 | 1.08 | 9.94 | 373 | 238 | 90 |
| 14 | 54.6 | 12.1 | 24.3 | 6.1 | 3.0 | 2.5/1 | 116.0 | 0.22 | 6.98 | 2.28 | 8.84 | 309 | 210 | 104 |

-continued

| Example | % FA | % Para-formaldehyde | % Phenol | % Aceto-phenone | % Water | Total Phenolic/$CH_2O$ (wt/wt) | Brookfield Viscosity 25° C. (cps) | % $CH_2O$ | % Phenol | % Aceto-phenone | % Water | Ambient (psi) | High Humidity (psi) | Strip Time (mins) |
|---|---|---|---|---|---|---|---|---|---|---|---|---|---|---|
| 15 | 54.6 | 12.1 | 12.1 | 18.1 | 3.0 | 2.5/1 | 92.0 | 0.42 | 2.45 | 5.13 | 8.55 | 245 | 199 | 221 |
| 16 | 63.3 | 12.7 | 16.4 | 4.2 | 3.0 | 1.66/1 | 86.0 | 0.46 | 3.32 | 1.27 | 7.17 | 306 | 224 | 103 |
| 17 | 63.3 | 12.7 | 8.4 | 12.7 | 3.0 | 1.66/1 | 70.4 | 2.04 | 1.57 | 2.86 | 7.97 | 333 | 207 | 185 |
| 18 | 60.6 | 8.1 | 16.2 | 12.1 | 3.0 | 3.5/1 | 58.0 | 0.14 | 6.61 | 4.65 | 6.30 | 267 | 194 | 157 |
| 19 | 45.9 | 15.3 | 20.4 | 15.3 | 3.0 | 2.33/1 | 151.6 | 0.33 | 4.27 | 5.13 | 9.47 | 289 | 189 | 129 |
| 20 | 54.3 | 18.9 | 11.9 | 11.9 | 3.0 | 1.25/1 | 152.8 | 2.62 | 1.24 | 2.21 | 8.72 | 312 | 223 | 133 |

In comparison with the binders of the above examples, a commercial foundry binder containing 95 parts furfuryl alcohol and 5 parts resorcinol gave in the same tests the following results:

|  | Test 1 | Test 2 |
|---|---|---|
| Tensile strength Ambient Humidity | 370 psi | 330 psi |
| Tensile strength High Humidity | 225 psi | 235 psi |
| Strip Time | 42 minutes | 38 minutes |

Compositions in accordance with the present invention have wide applicability as binders not only in the metal founding art but also in other similar applications in which resinous binders are employed, such as for the production of carbon articles such as carbon seals, carbon vanes and reclaimed coke, and for the production of composite articles such as fiberglass and the like. The following examples are representative of additional binder applications.

EXAMPLE 21

Approximately 2% of triethylenetetramine (TETA) and 70-75% carbon particles are thoroughly blended. To this dry amine-carbon mixture is added 16-23% of a liquid mixture of an "AP bottoms" binder prepared as described above and adjusted to a viscosity of 2500 centipoises by the addition of furfuryl alcohol. The mixing apparatus is cooled throughout the blending of the ingredients. Within about 10 minutes of the addition of the resin binder system, the temperature of the resulting mixture starts dropping gradually from a peak of 50°-60° C. Mixing of the ingredients is continued for a total of twenty minutes when a dry, free-flowing particulate solid is obtained.

The free-flowing powder was later placed into a preheated (60°-65° C.) extruder and extruded through a die into rods. The green carbon rods were baked and thoroughly carbonized by baking in a reducing atmosphere with a programmed temperature rise to 650° C. and holding at that temperature for 48 hours. When carbonized, the rods had satisfactory density and resistivity for use as electrode. No bleeding or cracking was observed. Objectionable gases in the stack gases from the carbonization furnace were reduced.

EXAMPLE 22

Twelve hundred grams of calcined anthracite are mixed with 150 grams of an "AP bottoms" binder prepared as set forth above, 150 grams of furfuryl alcohol and 30 grams of zinc chloride (50% ethanol solution). The mixture is mixed to a uniform consistency and diluted with furfuryl alcohol, if necessary, to a viscosity of 200 centipoises, Brookfield at 25° C. The resulting mixture is compacted or tamped into place between two carbon blocks, cured at 200° and carbonized in a programmed temperature rise to 100° C. at 10° C. per hour. The resulting carbonized assembly was tested for tensile force, i.e., the force required to pull the ramming mix from the carbon block. A high adhesion or bond of the block to the ramming mix was noted.

Those modifications and equivalents which fall within the spirit of the invention are to be considered a part thereof.

What is claimed is:

1. A binder composition comprising the product prepared by reacting in furfuryl alcohol under alkaline conditions paraformaldehyde, phenol and the bottoms from distillation of acetone and phenol from the reaction mixture resulting from oxidizing cumene to hydroperoxide, cleaving the hydroperoxide and neutralizing the cleaved products.

2. A binder in accordance with claim 1 which also includes a silane.

3. A binder for foundry core sands in accordance with claim 1.

4. A process for manufacturing foundry sand shapes for use as cores and molds comprising placing a sand mix in a shaping element and hardening the mix in the shaping element, the sand mix comprising sand, an acid catalyst and a binder comprising the product prepared by reacting in furfuryl alcohol under alkaline conditions paraformaldehyde, phenol and the bottoms from distillation of acetone and phenol from the reaction mixture resulting from oxidizing cumene to hydroperoxide, cleaving the hydroperoxide and neutralizing the cleaved products.

5. A process in accordance with claim 4 in which the binder also includes a silane.

6. A process for preparing a binder composition which comprises reacting in furfuryl alcohol under alkaline conditions paraformaldehyde, phenol and the bottoms from distillation of acetone and phenol from the reaction mixture resulting from oxidizing cumene to hydroperoxide, cleaving the hydroperoxide and neutralizing the cleaved products.

* * * * *